(12) United States Patent
Indiresan et al.

(10) Patent No.: US 10,367,691 B2
(45) Date of Patent: Jul. 30, 2019

(54) MULTI PLATFORM STATIC SEMANTIC CONSISTENCY CHECKING OF NETWORK CONFIGURATIONS

(71) Applicant: Cisco Technology, Inc., San Jose, CA (US)

(72) Inventors: Atri Indiresan, Sunnyvale, CA (US); Aniket Ghule, San Jose, CA (US); Himanshu Jain, San Jose, CA (US); Mariam Zaim, West Layfayette, IN (US)

(73) Assignee: Cisco Technology, Inc., San Jose, CA (US)

( * ) Notice: Subject to any disclaimer, the term of this patent is extended or adjusted under 35 U.S.C. 154(b) by 301 days.

(21) Appl. No.: 15/461,716

(22) Filed: Mar. 17, 2017

(65) Prior Publication Data

US 2018/0270114 A1    Sep. 20, 2018

(51) Int. Cl.
*G06F 15/177*    (2006.01)
*H04L 12/24*    (2006.01)
*H04L 12/26*    (2006.01)

(52) U.S. Cl.
CPC ...... *H04L 41/0869* (2013.01); *H04L 41/0883* (2013.01); *H04L 43/18* (2013.01)

(58) Field of Classification Search
USPC ....... 709/203, 206, 217, 219, 221, 223, 224, 709/226, 228, 232, 238; 707/812; 705/26.5; 717/128; 370/244
See application file for complete search history.

(56) References Cited

U.S. PATENT DOCUMENTS

| | | | |
|---|---|---|---|
| 8,775,484 B2* | 7/2014 | Sakai | H04L 67/125 707/812 |
| 8,938,720 B2* | 1/2015 | Meijler | G06F 11/3476 717/128 |
| 9,762,430 B2* | 9/2017 | Hong | H04L 41/044 |
| 10,002,011 B2* | 6/2018 | Lissack | H04L 41/5054 |
| 10,218,600 B2* | 2/2019 | Chen | H04L 45/122 |
| 2009/0010171 A1* | 1/2009 | Gupta | H04L 41/0631 370/244 |
| 2009/0089276 A1* | 4/2009 | Fukuda | G06Q 10/06 |
| 2014/0095343 A1* | 4/2014 | Daniel | G06Q 30/0621 705/26.5 |
| 2017/0257228 A1* | 9/2017 | Chen | H04L 45/04 |

\* cited by examiner

*Primary Examiner* — Quang N Nguyen
(74) *Attorney, Agent, or Firm* — Merchant & Gould P.C.

(57) ABSTRACT

Semantic checking of multi-device and protocol configurations based on an extensible rules database for a variety of devices and operating systems may be provided. First, a configuration may be received. Then parent-child hierarchical relationships in the configuration may be determined. Next, a set of rules may be applied to the configuration based upon the determined parent-child hierarchical relationships. A report of errors found and corrective suggestions may then be produced in response to applying the set of rules.

12 Claims, 4 Drawing Sheets

MULTI PLATFORM STATIC SEMANTIC CONSISTENCY CHECKING OF NETWORK CONFIGURATIONS

TECHNICAL FIELD

The present disclosure may relate generally to network configuration checking.

BACKGROUND

A computer network is a network of computing devices that allows the computing devices to share resources. In computer networks, computing devices exchange data with each other using connections such as data links. The connections between computing devices are established using either cable media or wireless media. An example of a computer network is the Internet.

Network computing devices that originate, route, and terminate the data are called network nodes. Network nodes can include hosts such as personal computers, phones, servers as well as networking hardware. Two such network nodes can be said to be networked together when one network nodes is able to exchange information with the other device, whether or not they have a direct connection to each other. Computer networks differ in the transmission medium used to carry their signals, communications protocols to organize network traffic, the network's size, topology, and organizational intent.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
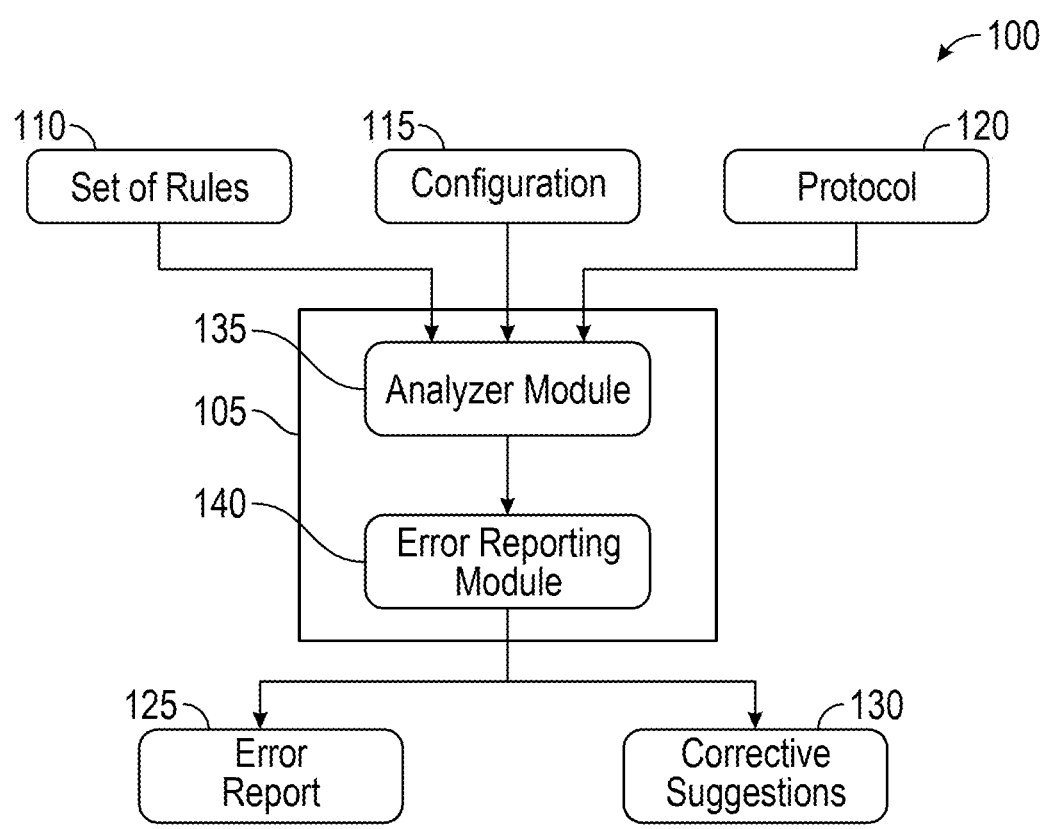
FIG. 1 is a block diagram of a system for providing semantic checking of multi-device and protocol configuration based on an extensible rules database.

Semantic checking of multi-device and protocol configurations based on an extensible rules database for a variety of devices and operating systems may be provided. First, a configuration may be received. Then parent-child hierarchical relationships in the configuration may be determined. Next, a set of rules may be applied to the configuration based upon the determined parent-child hierarchical relationships. A report may then be produced in response to applying the set of rules.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Network devices (e.g., routers, switches, etc.) may have a configuration and may be configured using a Command Line Interface (CLI) (or via a programmable interface) that saves the configuration either as a CLI or some kind of database. A single network device may support a large number of interdependent features that may depend on interface, protocol, policy, and configurations for example. Because networks may be distributed systems, they may include complex dependencies across multiple network devices. Due to these complex dependencies across multiple network devices, even if the configurations may be syntactically correct, the semantics of the configurations may be inconsistent or incomplete, either within one or more modules on a single network device or across multiple network devices. These network devices could also have different operating systems and configuration models, increasing the complexity.

These kinds of semantic configuration errors may be common, both in customer networks, as well as for development and test engineers during product development. It may not be uncommon to have errors that get resolved with a correction to a configuration rather than a software bug requiring a code change. Though the correction itself may be low cost, finding a semantic configuration error may be very challenging due the large configurations and large number of devices. In addition, people may not be good at spotting typographical errors because people may often see what they expect to see rather than an abnormality. Embodiments of the disclosure may provide a tool that may analyze configurations across a network, identify potential problems, and suggest corrections to these identified potential problems.

FIG. 1 is a block diagram of a system 100 for providing semantic checking of multi-device and protocol configuration based on an extensible rules database. As shown in FIG. 1, system 100 may comprise a computing device 105, a set of rules 110, a configuration 115, a protocol 120, an error report 125, and corrective suggestions 130. Computing device 105 may include an analyzer module 135 and an error reporting module 140. Computing device 105 may be described in greater detail below with respect to FIG. 4.

Inputs may be provided to computing device 105. These inputs may comprise set of rules 110, configuration 115, and protocol 120. Set of rules 110 may comprise, but is not limited to, a JSON-formatted file that contains a list of rules. Each rule may define a certain kind of misconfiguration for a network device or multiple network devices in a common network. Configuration 115 may either be from a single network device or multiple devices in a common network. For example, configuration 115 may comprise the configuration as output by executing a "show running-config" command on CLI of a network device. Configuration 115, for example, may be from file path(s) to local file(s) that contain the configuration or Internet Protocol (IP) addresses and port numbers (e.g., console connection) to remote network device(s). Protocol 120 may comprise, but is not limited to, Locator/ID Separation Protocol (LISP), Open Shortest Path First (OSPF), or Multiprotocol Label Switching (MPLS).

Given these of inputs, analyzer module 135 (e.g., using Python scripts) in computing device 105 may process data from the inputs, parse set of rules 110, and analyze configuration 115. Analyzer module 135 may send result of the analysis to error reporting module 140 that may produce output comprising, but not limited to, error report 125 as well as corrective suggestions 130 on how to take corrective actions for example.

Figure 2:
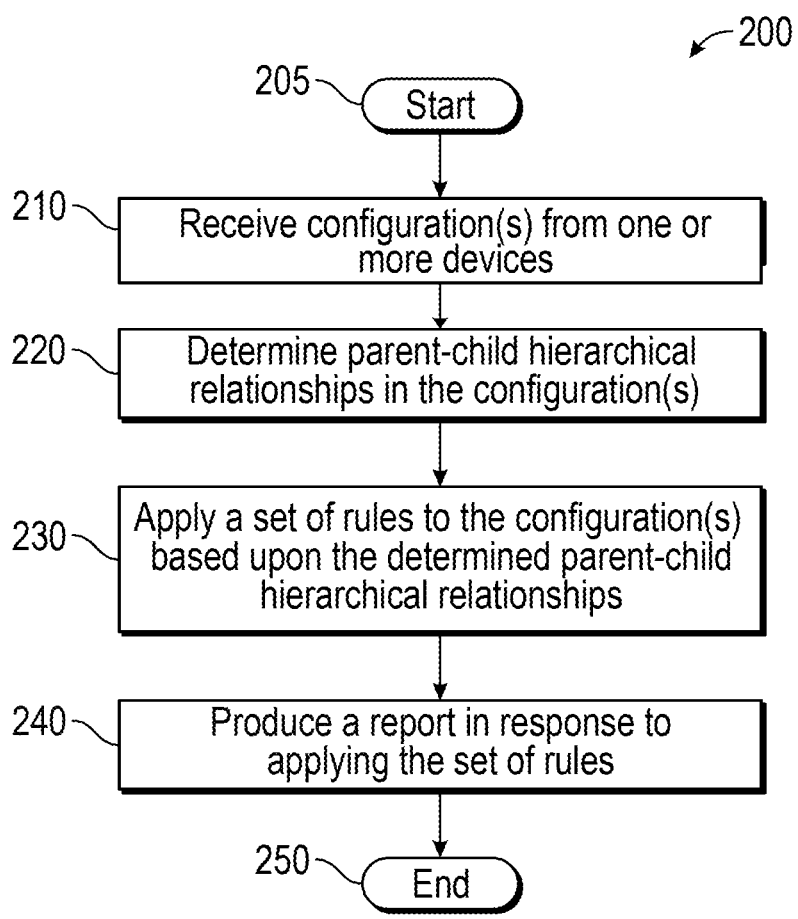
FIG. 2 is a flow chart of a method for providing semantic checking of multi-device and protocol configuration based on an extensible rules database.

FIG. 2 is a flow chart setting forth the general stages involved in a method 200 consistent with an embodiment of the disclosure for providing semantic checking of multi-device and protocol configuration based on an extensible rules database for a variety of devices and operating systems. Method 200 may be implemented using software modules (e.g., analyzer module 135 and error reporting module 140) executed on computing device 105 as described in more detail above with respect to FIG. 1 and below with respect to FIG. 4. Ways to implement the stages of method 200 will be described in greater detail below.

Method 200 may begin at starting block 205 and proceed to stage 210 where computing device 105 may receive configuration 115. For example, analyzer module 135 may load configuration 115 (e.g., a CLI-based configuration) per device in the network specified by a user for example. The user may upload files containing configuration 115 for each device. Or the user may provide an IP address that analyzer module 135 may use to extract a running configuration as configuration 115 from a host via telnet libraries for example. Analyzer module 135 may also select protocol 120 to analyze/verify in received configuration 115.

From stage 210, where computing device 105 receives configuration 115, method 200 may advance to stage 220 where computing device 105 may determine parent-child hierarchical relationships in configuration 115. For example, received configuration 115 may be parsed and used to derive a parent-child relationship between each line of configuration 115. For example, the number of spaces at the beginning of a line in configuration 115 may indicate its position in the hierarchy. For the CLI example below, "router lisp" may be the topmost parent, with "site" as its child, and "eid-prefix" its grandchild. In order to define rules, embodiments of the disclosure may be aware of these parent-child relationships.

router lisp
   site SanJose
      eid-prefix 20.1.1.0/24 accept-more-specifics

The parent-child hierarchical relationships may be determined based on other syntactical elements in addition to the number of spaces at the beginning of lines in the received configuration. These other syntactical elements may comprise, for example, nested braces, parentheses, brackets etc. ("{ ... }", "( ... )", "[ ... ]" respectively). Furthermore the parent-child hierarchical relationships may be determined based textual elements, for example, BEGIN/END and eXtensible Markup Language (XML) tags.

Figure 3:
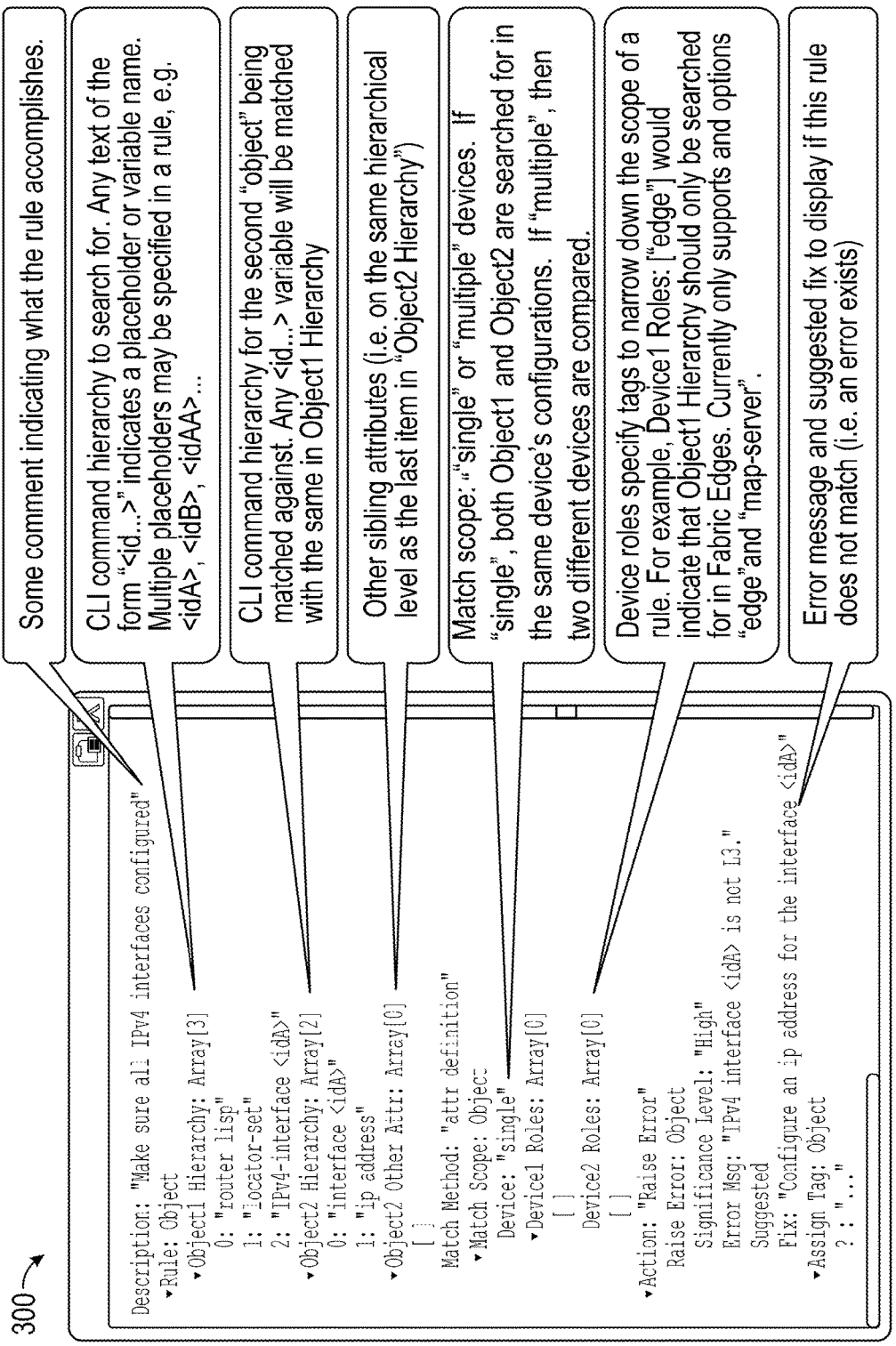
FIG. 3 is a block diagram showing an example rule format.

Once computing device 105 determines the parent-child hierarchical relationships in configuration 115 in stage 220, method 200 may continue to stage 230 where computing device 105 may apply set of rules 110 to configuration 115 based upon the determined parent-child hierarchical relationships. For example, in order to define the types of CLI configurations or inconsistencies that need to be registered as errors, analyzer module 135 may operate on set of rules 110 (e.g., JSON-formatted). Each rule definition in set of rules 110 may include a pair of CLI lines that may be matched against each other (e.g., whether in part, or in whole; whether by exact string match, or e.g., a subnet match). FIG. 3 shows an example rule format 300 with example descriptions of each field. Applying the set of rules may comprise applying the set of rules wherein each rule in the set of rules may comprise two or more hierarchical elements (e.g., the aforementioned syntactical elements or textual elements) that may be matched against each other. The match rule need not just be equality, but could be any other comparison such as less than, greater than, substring match etc. With a user supplied match function, this could be complex, based on the semantic requirement. Set of rules 110 may specify the hierarchy of CLI commands by which the two CLI lines can be found. For each rule in set of rules 110, there may be custom error messages and suggestions for correcting the error, as well as indicating whether the rule is being matched within the configuration of a single device or across multiple devices. The scope of the rule match may be specified by indicating device roles that the rule may be applied to. For example, a rule may only be applied to a Map Server in a Secure Fabric network. Analyzer module 135 may be able to determine the roles of a device from its configuration (e.g., a Map Server's configuration may be required to contain a CLI line of the form: "ipv4 map-server").

Rules in set of rules 110 may be IF-ELSE. For example, if Object1 Hierarchy is found, then Object2 Hierarchy may be searched for. If Object1 Hierarchy is not found, it may not be considered an error. Accordingly, if Object1 Hierarchy is something that should be configured, then a separate rule may be written to capture this. In addition, placeholders/variables (e.g., <id ... >) may first be defined in Object1 Hierarchy before being used in Object2 Hierarchy for example. If some attribute that appears in different hierarchies of configuration 115 that may need to be matched in three different places (e.g., lineA, lineB, lineC), then two rules, for example, may be written: one to match lineA with lineB and another to match LineB (or lineA) with lineC. Below is a single device rule example.

```
{
  "Description": "Make sure all IPv4 interfaces that are a part
of a locator-set have been configured.",
  "Rule": {
    "Object1 Hierarchy": ["router lisp", "locator-set",
    "IPv4-interface <idX>"],
    "Object2 Hierarchy": ["interface <idX>"],
    "Object2 Other Attr": [ ],
    "Match Method": "attr definition",
    "Match Scope": {
      "Device": "single",
      "Device1 Roles": [ ],
      "Device2 Roles": [ ]
    }
  },
  "Action": "Raise Error",
  "Raise Error": {
    "Significance Level": "High",
    "Error Msg": "IPv4 interface <idX> has not been configured.",
    "Suggested Fix": "Configure the interface <idX>."
  }
}
```

In the above example of a single-device rule, analyzer module 135 may start with the "Object1 Hierarchy", and search for a configuration line that matches "router lisp". If found, analyzer module 135 may proceed to look under the children of "router lisp" for all "locator-set" CLIs, and so forth, until the whole hierarchy has been traversed. Any text in the rule of the format <id . . . > may indicate a variable, or a placeholder, that may need to be matched with the same defined in the "Object2 Hierarchy". Multiple variables may be specified in their rules. If a matching "object2" CLI line is found, then the rule maybe concluded a success. Otherwise, this may constitute an error in the configuration.

Below is a multi-device rule example. In the below multi-device rule example, the two object hierarchies may be traversed in a similar fashion as described above with respect to the single-device rule example. One difference may comprise the "Match Scope", which may determine that "Object1 Hierarchy" and "Object2 Hierarchy" may exist on two different devices. Furthermore, the match scope may be narrowed down by specifying the device roles (e.g., "edge" for Object1 and "map-server" for Object2).

```
{
  "Description": "Make sure the Map Server contains eid-prefixes for all FEs on the site.",
  "Rule": {
    "Object1 Hierarchy": ["router lisp", "eid-table default instance-id <idA>", "dynamic-eid", "database-mapping <idB>"],
    "Object1 Other Attr": [ ],
    "Object2 Hierarchy": ["router lisp", "site", "eid-prefix <idB>"],
    "Object2 Other Attr": [ ],
    "Match Method": "attr definition",
    "Match Scope": {
      "Device": "multiple",
      "Device1 Roles": ["edge"],
      "Device2 Roles": ["map-server"]
    }
  },
  "Action": "Raise Error",
  "Raise Error": {
    "Significance Level": "High",
    "Error Msg": "Could not find this eid-prefix (instance id <idA>) on the Map Server",
    "Suggested Fix": "Configure the site eid-prefixes on the Map Server."
  }
}
```

Regarding Multi-OS extensions, because the rule definitions may take the form of hierarchical CLI commands, and analyzer module 135 may utilize basic string matching to determine inconsistencies in configuration 115. This may allow for a platform-independent multi-OS tool. With the knowledge of protocol configuration syntax for each OS, rules may be defined specific to the CLI used by that OS. Configurations expressed as a hierarchical database may be analyzed similarly.

After computing device 105 applies set of rules 110 to configuration 115 based upon the determined parent-child hierarchical relationships in stage 230, method 200 may proceed to stage 240 where computing device 105 may produce a report in response to applying the set of rules. For example, analyzer module 135 may send result of the analysis to error reporting module 140 that may produce output comprising, but not limited to, error report 125 as well as corrective suggestions 130 on how to take corrective actions for example. Once computing device 105 produce the report in response to applying set of rules 110 in stage 240, method 200 may then end at stage 250.

Consistent with embodiments of the disclosure, semantic checking of multi-device and protocol configuration based on an extensible rules database for a variety of devices and operating systems may be provided. It may allow users to manually add rules to the database any time a configuration error is detected so that the same error is detected automatically in the future. This may apply to multiple unlike devices and operating systems as long as configuration syntactic elements may be used to derive canonical objects that may be used in set of ruled 110. While the configuration parser may be different based on the platform, the semantic rules engine may be shared.

Figure 4:
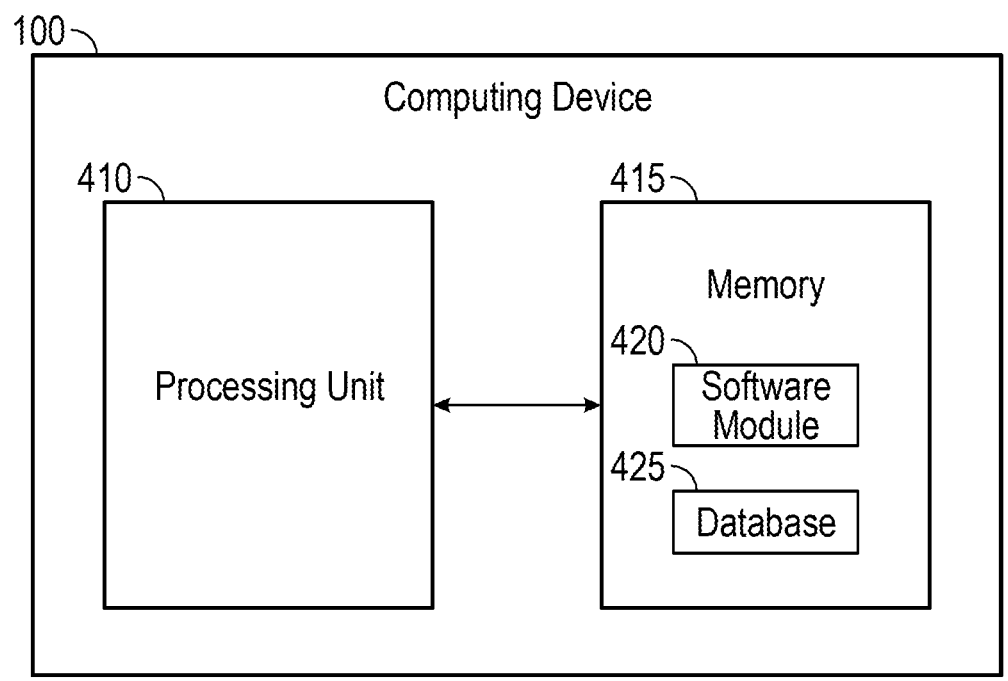
FIG. 4 is a block diagram of a computing device.

FIG. 4 shows computing device 105 in more detail. As shown in FIG. 4, computing device 105 may include a processing unit 410 and a memory unit 415. Memory unit 415 may include a software module 420 (e.g., analyzer module 135 and error reporting module 140) and a database 425. While executing on processing unit 410, software module 420 may perform processes for providing semantic checking of multi-device and protocol configuration based on an extensible rules database, including for example, any one or more of the stages from method 200 described above with respect to FIG. 2.

Computing device 105 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device. Computing device 105 may comprise any computer operating environment, such as hand-held devices, multi-processor systems, microprocessor-based or programmable sender electronic devices, minicomputers, mainframe computers, and the like. Computing device 105 may also be practiced in distributed computing environments where tasks are performed by remote processing devices. Furthermore, computing device 105 may comprise, for example, a mobile terminal, such as a smart phone, a cellular telephone, a cellular telephone utilizing Wireless Application Protocol (WAP) or unlicensed mobile access (UMA), personal digital assistant (PDA), intelligent pager, portable computer, a hand-held computer, a conventional telephone, or a Wireless Fidelity (Wi-Fi) access point. The aforementioned systems and devices are examples and computing device 105 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
receiving a configuration;
receiving a protocol type corresponding to the configuration;
determining, by a computer, parent-child hierarchical relationships in the configuration wherein determining the parent-child hierarchical relationships comprises determining the parent-child hierarchical relationships based on syntactical elements of the received configuration;
applying a set of rules to the configuration based upon the determined parent-child hierarchical relationships and upon the received protocol type; and
producing a report in response to applying the set of rules wherein producing the report comprises producing the report wherein the report indicates at least one of the following: errors in the configuration and corrective suggestions corresponding to the configuration;
wherein applying the set of rules comprises applying the set of rules wherein each rule in the set of rules comprises at least two hierarchical elements that are to be matched against each other.

2. The method of claim 1, wherein receiving the configuration comprises receiving the configuration from one of the following: a network device and multiple network devices in a common network.

3. The method of claim 1, wherein determining the parent-child hierarchical relationships based on the syntactical elements in the configuration comprises determining the parent-child hierarchical relationships based on the syntactical elements comprising at least one of the following: a number of spaces at the beginning of lines in the received configuration, nested braces in the received configuration, parentheses in the received configuration, and brackets in the received configuration.

4. The method of claim 1, wherein determining the parent-child hierarchical relationships comprises determining the parent-child hierarchical relationships based on textual elements in the configuration.

5. The method of claim 4, wherein determining the parent-child hierarchical relationships based on the textual elements in the configuration comprises determining the parent-child hierarchical relationships based on the textual elements comprising at least one of the following: BEGIN/END and eXtensible Markup Language (XML) tags.

6. The method of claim 1, wherein applying the set of rules comprises applying the set of rules wherein each rule defines a misconfiguration.

7. An apparatus comprising:
a memory storage; and
a processing unit coupled to the memory storage, the processing unit being configured to:
receive a configuration;
receive a protocol type corresponding to the configuration;
determine parent-child hierarchical relationships in the configuration wherein determined the parent-child hierarchical relationships comprises determine the child-parent hierarchical relationships based on syntactical elements of the received configuration;
apply a set of rules to the configuration based upon the determined parent-child hierarchical relationships and upon the received protocol type; and produce a report in response to applying the set of rules wherein producing the report comprises producing the report wherein the report indicates at least one of the following: errors in the configuration and corrective suggestions corresponding to the configuration;

wherein applying the set of rules comprises applying the set of rules wherein each rule in the set of rules comprises at least two hierarchical elements that are to be matched against each other.

8. The apparatus of claim 7, wherein the processing unit being configured to receive the configuration comprises the processing unit being configured to receive the configuration from one of the following: a network device and multiple network devices in a common network.

9. The apparatus of claim 7, wherein the processing unit being configured to apply the set of rules comprises the processing unit being configured to apply the set of rules wherein each rule defines a misconfiguration.

10. A non-transitory computer-readable medium that stores a set of instructions which when executed perform a method executed by the set of instructions comprising:
receiving a configuration;
receiving a protocol type corresponding to the configuration;
determining parent-child hierarchical relationships in the configuration wherein determining the parent-child hierarchical relationships comprises determining the parent-child hierarchical relationships based on syntactical elements of the received configuration;
applying a set of rules to the configuration based upon the determined parent-child hierarchical relationships and upon the received protocol type; and
producing a report in response to applying the set of rules wherein producing the report comprises producing the report wherein the report indicates at least one of the following: errors in the configuration and corrective suggestions corresponding to the configuration;
wherein applying the set of rules comprises applying the set of rules wherein each rule in the set of rules corn rises at least two hierarchical elements that are to be matched against each other.

11. The non-transitory computer-readable medium of claim 10, wherein receiving the configuration comprises receiving the configuration from one of the following: a network device and multiple network devices in a common network.

12. The non-transitory computer-readable medium of claim 10, wherein applying the set of rules comprises applying the set of rules wherein each rule defines a misconfiguration.

* * * * *